Nov. 9, 1965   L. A. KNOX   3,217,287
ARRAY PHASING BY VARIABLE-SPEED MAGNETIC DRUMS
Filed March 14, 1963   6 Sheets-Sheet 1

INVENTOR.
LEWIS A. KNOX
BY
Philip Schneider
ATTORNEY

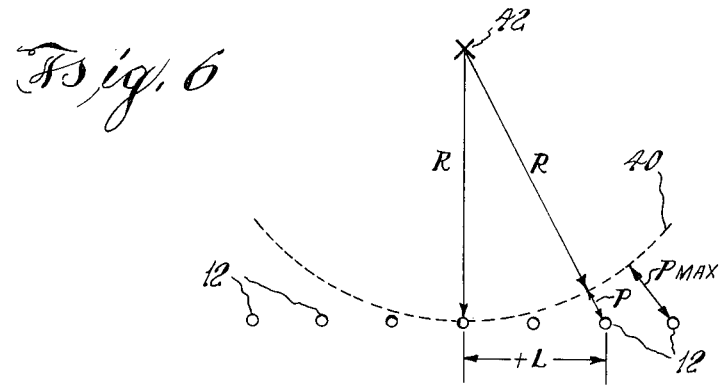
Fig. 6
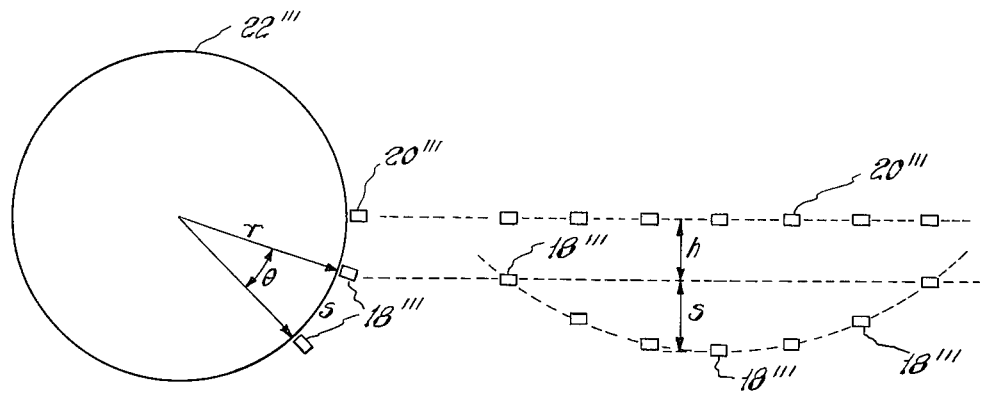
Fig. 7a
Fig. 7b
INVENTOR.
LEWIS A. KNOX

Nov. 9, 1965  L. A. KNOX  3,217,287
ARRAY PHASING BY VARIABLE-SPEED MAGNETIC DRUMS
Filed March 14, 1963  6 Sheets-Sheet 6

INVENTOR.
LEWIS A. KNOX
BY Philip Schneider
Louis B. Applebaum
ATTORNEYS

3,217,287
ARRAY PHASING BY VARIABLE-SPEED MAGNETIC DRUMS

Lewis A. Knox, Owego, N.Y., assignor, by mesne assignments, to the United States of America as represented by the Secretary of the Navy
Filed Mar. 14, 1963, Ser. No. 265,299
6 Claims. (Cl. 340—6)

This application is a continuation-in-part of application Serial No. 213,063, filed July 27, 1962 and now abandoned.

This invention relates to a magnetic drum apparatus and especially to the phasing of electro-magnetic and electroacoustic transducer arrays by varying the speed of rotation of magnetic drums.

The invention will be described with reference to sonar hydrophone transducer arrays although it may be employed with other types of transducer arrays.

Highly directive hydrophone arrays generally require a great number of individual hydrophone elements and tend to be quite large and cumbersome. Direction of the beam (directivity pattern) by physical rotation of the entire array is often impractical. One method employed to avoid physical rotation while permitting the beam to be scanned is the use of electrically controlled delays for the phase adjustment of each hydrophone signal. To avoid deterioration of the directional pattern of the array, the phasing delays must be within $1/20$ of a wave length of their correct values.

When continuously adjustable delays (or $1/20$ wave length step delays) must be provided for a large number of hydrophone elements and the amplitude information of the hydrophone signals must be preserved, conventional delay equipment, such as analog LC delay lines, digital shift registers and digital magneto-strictive delay lines, is prohibitively large. Variable-speed magnetic drum equipment for this purpose is, on a relative basis, extremely small and simple.

The object and advantages of the present invention are accomplished by utilizing one or more magnetic drums having "write" heads connected to the individual hydrophone elements in the array and "read" heads whose radial distances from their associated "write" heads increase linearly in proportion to the axial distance of the "read" heads along the drum. The speed of the drum is variable, for example by means of a variac which controls the A.-C. input to the servo motor which rotates the drum, and the magnitude of the constant of proportionality (the delay taper) of the delay depends on the speed of the drum. Thus, the amount of delay inserted in each hydrophone channel can be varied by a simple adjustment of the speed of the magnetic drum.

To compensate for the delays occasioned by spherical wavefronts, a separate drum is employed. The "read" heads are arranged axially along the drum in accordance with a function of the axial distances of their associated transducer elements from the central transducer in the array. The amount of delay inserted in each hydrophone channel by this drum, also, can be varied by a simple adjustment of the speed of the drum.

An object of the invention is to direct the beam of a transducer array by electrical phasing means.

Another object is to electrically phase the signals of the elements of a transducer array in a simple manner.

A further object is to provide electrical delay means for directing the beam of a transducer array, said delay means being relatively small and simple.

Yet another object is to compensate for the delays introduced into a linear transducer array by spherical wavefronts.

Other objects and many of the attendant advantages of this invention will be readily appreciated as the same becomes better understood by reference to the following detailed description when considered in connection with the accompanying drawings wherein:

FIG. 6 is a diagram representing a spherical wavefront as it impinges upon a linear transducer array;

FIG. 7a is a schematic illustration of an end view of the magnetic drum associated with the read and write heads shown in FIG. 7b;

FIG. 7b is a diagram illustrating the positioning of the "write" and "read" heads along the magnetic drum for correction of a spherical wavefront.

Figure 1:
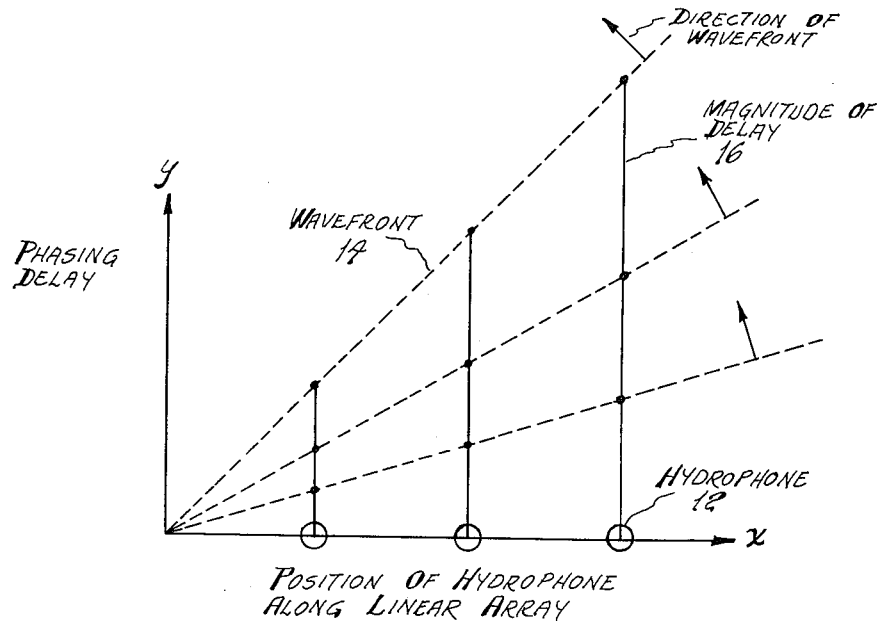
FIG. 1 is a graphical diagram illustrating the phasing delay relations for a linear array of hydrophones and for different wave front directions.

FIG. 1 shows a number of transducer elements 12, which may, for example, be hydrophones, arranged in a linear, one-dimensional array. The line through their centers is taken as the $x$-axis of an orthogonal set of $x$–$y$ axes, the $x$-axis showing the distance of each hydrophone along the linear array and the $y$-axis showing the amount of delay 16 which must be introduced into each hydrophone channel for a given wave direction to phase the array to produce maximum array output. Three wavefronts 14 are indicated along with the magnitudes of delay which are necessary for each hydrophone in each case.

Figure 2:
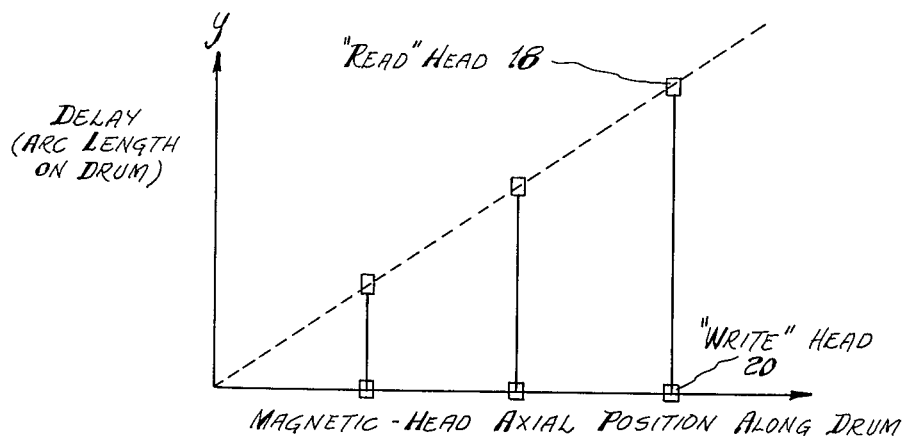
FIG. 2 is a graphical diagram illustrating the placement of the "write" and "read" heads in relation to each other and to axial position along the magnetic drum.

The equation of any straight line can be written $y = a + bx$ where $a$ is the intercept on the $y$ axis and $b$ is the slope of the line. In FIG. 1, $a = 0$ and $y$ is simply equal to $bx$. To provide the different phasing delays required by the various hydrophone channels, the "read" heads 18 are positioned at the drum along a straight line which has a slope relative to the axis, or line of centers, through the "write" heads 20, as illustrated in FIG. 2. The time delay, $t$, in seconds for any given "read" head is then given by the equation $$t = \frac{y}{\dot{\theta}(r)}$$

where $y$ is the circumferential distance of the "read" head from its associated "write" head, $\dot{\theta}$ is the angular drum speed in radians per second and $r$ is the radius of the drum. In the general case, $$t = \frac{y}{\dot{\theta}(r)} = \frac{a}{\dot{\theta}(r)} + \frac{b}{\dot{\theta}(r)} x \qquad (I)$$

The term $b/\dot{\theta}(r)$ is the constant of proportionality called the linear delay taper, or simply the delay taper, which determines the exact amount of delay provided for each hydrophone channel. The delay taper in turn determines the angle or direction of maximum response of the array, which is another way of saying that it determines the direction of the beam of the array.

It can be seen from the last equation that the beam direction of the linear array of transducers is directly proportional to the slope of the line through the centers of the "read" heads and inversely proportional to the angular speed of rotation of the drum and to the radius of the drum.

Although not illustrated in the drawing, it is obvious that an "erase" head must be provided for each channel.

Figure 3:
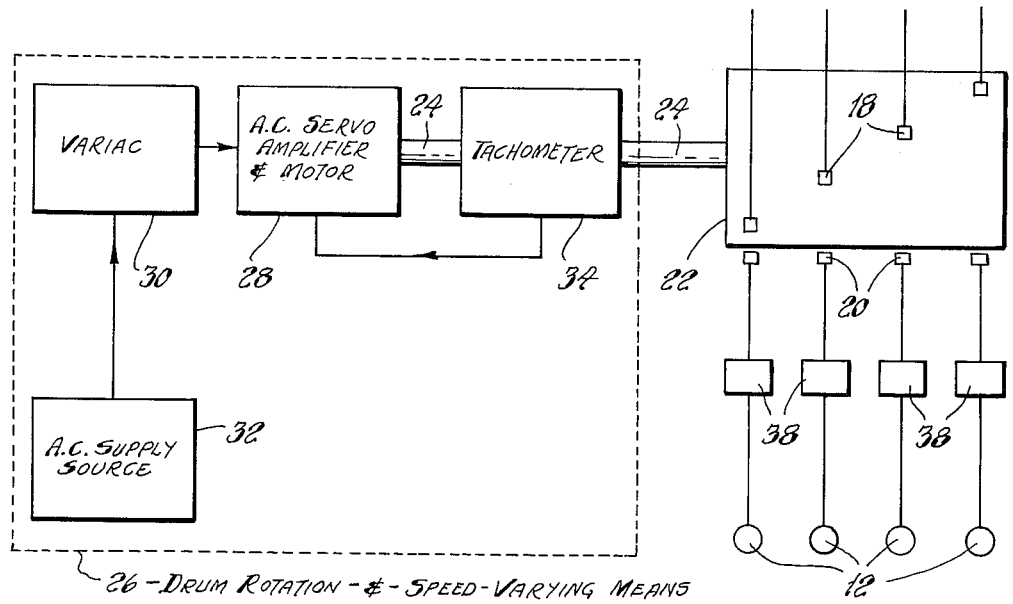
FIG. 3 is a schematic illustration of an embodiment of the invention.

One embodiment of the invention which can be used for directing the beam of a linear array of transducer elements is shown in FIG. 3. Here the magnetic "write" heads 20 are arranged along a line parallel to the axis of the magnetic drum 22 and the magnetic "read" heads 18 are arranged along a line which has a slope relative to the line through the centers of the "write" heads. Although not shown, it is understood that each consecutive "write" head 20 is connected to a different transducer element in the linear transducer array in successive order and that the "read" heads 18 are connected to signal utilization apparatus which is not part of this invention. Amplifiers 38 may be inserted in the information channels wherever necessary as, for example, between each transducer element 12 and its electrically associated "write" head 20.

The drum 22 is mounted on a shaft 24 and rotated by drum rotation-and-speed-varying means 26. The latter may, for example, comprise an A.-C. servo motor and amplifier 28 which is supplied through a variac 30 from an A.-C. source of supply 32. Control of the variac dial varies the speed of the servo and therefore the speed of the drum 22. Stability of the system is increased by feedback to the A.-C. servo amplifier and motor 28 from a tachometer 34 mounted on the drum shaft 24 which may be the motor shaft itself or may be coupled to the motor shaft.

Figure 4:
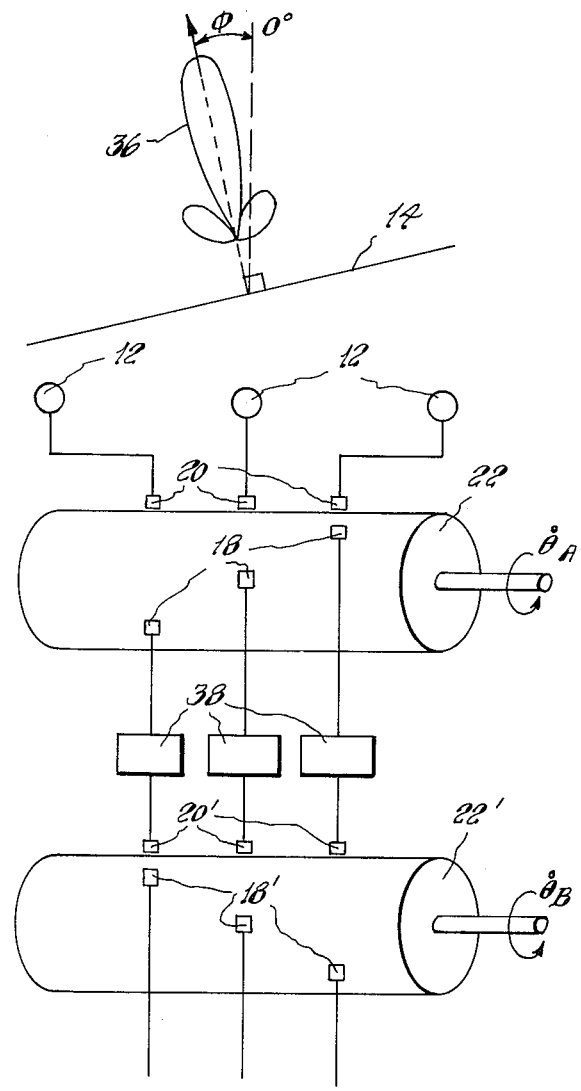
FIG. 4 is a schematic illustration of an embodiment of the invention utilizing two magnetic drums.

FIG. 4 illustrates an embodiment in which antenna beam scanning is accomplished by means of two variable-speed magnetic drums 22 and 22'. The antenna beam is designated by the numeral 36, the angle between the center of the beam and the forward direction (0°) by the letter $\phi$, and the wave front by the numeral 14. The delay tapers of the two drums are opposite to each other and therefore subtract from each other. For the beam direction $\phi$ drum 22 operates at a low speed, $\dot{\theta}_a$, and drum 22' at a high speed, $\dot{\theta}_b$. The drum which operates at a high speed contributes very little delay. As the drum speeds approach each other, the angle $\phi$ decreases until, when the speeds are equal, the angle $\phi$ is zero degrees, i.e., the direction of the antenna beam is straight ahead. As the speed of drum 22 increases over that of drum 22', the beam direction shifts more and more to the right of the 0° position. Thus, beam scanning is accomplished by drum-speed control.

The required diameter of each magnetic drum may be calculated from the following relation:

$$D \approx \left( \frac{N}{\pi} \left[ 0.3 + (\dot{\theta}r) \frac{(\Delta t)_{max.}}{2} \right] \right)^{1/2} \qquad (II)$$

where $D=$drum diameter in inches
$\dot{\theta}r=$surface speed of drum in inches/second
$N=$number of delay channels
$(\Delta t)_{max.}=b/(\dot{\theta}r)_{min.}$ $X_{max.}=$maximum differential delay in seconds.

This approximate relation is for: (1) a drum whose length equals its diameter; (2) three magnetic heads (erase, write, and read) per delay channel, and; (3) magnetic heads with dimensions of .25″ track width by .40″ track arc length.

Scanning speeds, that is, drum accelerations, must be low enough so that writing and reading speeds are approximately equal. This minimizes deterioration of the array directional pattern and provides the necessary time for signal to noise ratio improvement through correlation, or time integration techniques.

Figure 5:
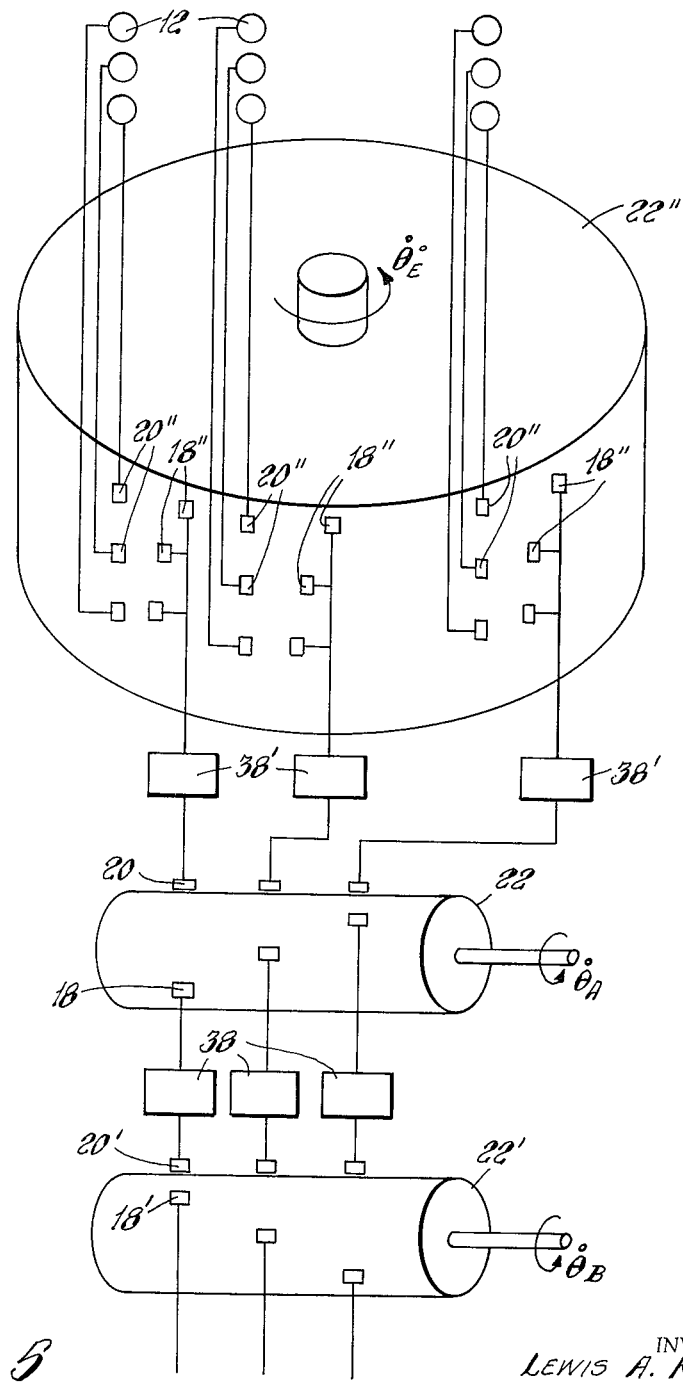
FIG. 5 is a schematic illustration of an embodiment of the invention which can be used to direct the beam of a three-dimensional transducer array.

An embodiment which is useful for the extension of the variable-speed magnetic-drum scanning method to two-dimensional arrays is shown in FIG. 5. Here the transducer elements 12 are first phased for maximum signal in the vertical direction by means of the vertical phasing drum 22″. The output from each vertical channel is then fed to a pair of horizontal phasing drums 22 and 22' which have opposite delay tapers as in FIG. 4. Thus, the antenna beam can be scanned in the horizontal direction (azimuth scanning) by varying the relative speeds of the horizontal phasing drums.

Of course, the method can be further extended to provide elevation scanning by adding another vertical phasing drum with a delay taper opposite to that of the drum 22″ in FIG. 5, the speed of the two vertical phasing drums being variable with respect to each other.

The invention can also be employed when the wavefront is spherical rather than plane. FIG. 6 represents diagrammatic illustration of the situation which occurs when a spherical-wavefront signal 40 is received by a 7-hydrophone linear array. The source 42 of the signal is at a range R from the center hydrophone of the array but, due to the curvature of the wave front, the other hydrophones experience a delay proportional to a distance P before the same wavefront reaches them. Each hydrophone experiences a different delay depending on its individual distance L outward from the center hydrophone.

Equations for determining the delay path length, S, along the circumference of the drum 22''' are given below.

$$(R+P)^2 = R^2 + L^2 \qquad (III)$$

$$P = R\left[\left(1 + \frac{L^2}{R^2}\right)^{1/2} - 1\right] \qquad (IV)$$

where $R=$range from source of spherical wavefront to center hydrophone
$L=$distance along line of centers of hydrophone under consideration to center hydrophone
$P=$delay path length from hydrophone in question to spherical wavefront at time wavefront reaches center hydrophone.

$$t_W + t_D = t_T \qquad (V)$$

$$t_T = \frac{P_{max.}}{V_W} \qquad (VI)$$

$$t_W = \frac{P}{V_W} \qquad (VII)$$

$$t_D = \frac{S}{V_D} = \frac{S}{r\dot{\theta}} \qquad (VIII)$$

where $t_W=$time of delay in medium in which wavefront is propagated
$t_D=$time of delay along drum
$t_T=$total delay time. (This is a constant for all hydrophones since $t_W$ and $t_D$ are inversely related to each other)
$P=$delay length in propagation medium for any hydrophone
$P_{MAX}=$delay path length for outermost hydrophone in array
$V_W=$velocity of wave in propagation medium $$V_D = r\dot{\theta} = r\frac{d\theta}{dt} = \text{drum surface velocity}$$

$S$ = delay path length along circumference of drum for any hydrophone.

Combining Equations V through VIII, we obtain:

$$S = \frac{r\theta_1}{V_w}[(P_1)_{MAX.} - P_1] = \frac{r\theta_2}{V_w}[(P_2)_{MAX.} - P_2] \quad (IX)$$

where $\theta_1$, $(P_1)_{MAX}$ and $P_1$ are for range $R_1$ and $\theta_2$, $(P_2)_{MAX}$ and $P_2$ are for range $R_2$.

For the center and end hydrophone signals to be exactly in phase at both ranges ($R_1$ and $R_2$), $P_1 = P_2$. Then by Equation IX:

$$\frac{\theta_2}{\theta_1} = \frac{(P_1)_{MAX.}}{(P_2)_{MAX.}} = \frac{R_1\left[1 + \left(\frac{L_{MAX.}}{R_1}\right)^2\right]^{1/2} - R_1}{R_2\left[1 + \left(\frac{L_{MAX.}}{R_2}\right)^2\right]^{1/2} - R_2} \quad (X)$$

FIGS. 7a and b show the arrangement of the "read" and "write" heads, 18''' and 20''', along the periphery of the magnetic drum 22''' in both side and front views.

To set up the "read" heads in proper position along the drum, choose an arbitrary convenient distance $h$ between the line of centers of the "write" heads and the center of the end, or nearest, "read" heads. Choose a desirable range $R_1$ and a desirable rate of rotation $\theta_1$ of the magnetic drum. Then, for each hydrophone, compute $P_1$ and $(P_1)_{MAX.}$ from Equation IV. Now, the location, $S$, for the read head associated with the hydrophone under consideration can be determined from Equation IX.

When the proper locations for all read heads have been determined by this procedure, all hydrophone signals will be exactly in phase for range $R_1$ and drum speed $\theta_1$. For another range $R_2$, another speed $\theta_2$ can be found at which all hydrophone signals will be approximately in phase (see Equation X).

Figure 8:
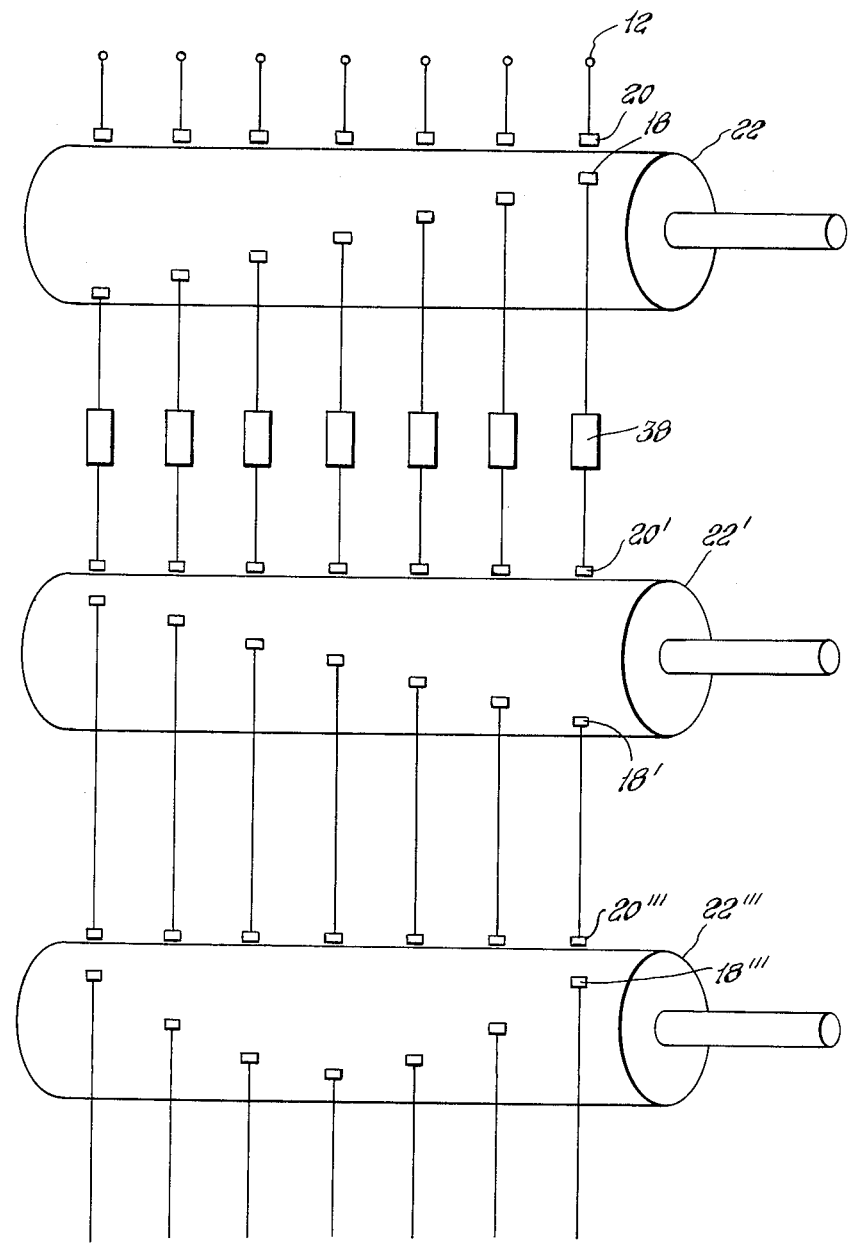
FIG. 8 is a schematic illustration of an embodiment which can be used both to direct the beam and to compensate for spherical wavefronts.

The foregoing discussion indicates the correction for a spherical wavefront when the direction of the beam is straight ahead ($\phi = 0$, or the axis of the beam is perpendicular to the axis through the linear array of hydrophones). However, in addition to the spherical wavefront, the beam may be at an angle, that is, the source of the signal may not be straight ahead of the array. In this case, two corrections are required: first, the beam is rotated as already described by magnetic drum delays with a linear taper; and second, the additional delays for spherical wavefront corrections are provided by a separate drum 22''' as shown in the embodiment of FIG. 8. Drums 22 and 22' provide the beam rotation and drum 22''', adjacent to which the read heads 18''' are arranged along a curve provides spherical corrections. A high rotational speed of drum 22''' results in a delay contour with a large radius of curvature suitable for distant signals, while a low speed results in a delay contour with a small radius of curvature suitable for short range signals.

Obviously many modifications and variations of the present invention are possible in the light of the above teachings. It is therefore to be understood that within the scope of the appended claims the invention may be practiced otherwise than as specifically described.

I claim:

1. Apparatus for phasing a linear array of transducer elements comprising, in combination:
   magnetic drum means mounted to be varied in rotational speed;
   means for varying the rotational speed of said drum means;
   means for recording the signal from each of the transducer elements in a separate channel on said magnetic drum means; and
   means for individually deriving said separate recorded signals and for introducing time delays between the recording and deriving of said recorded signals,
   the amount of delay introduced into each channel being proportional to a function of the axial distance from a reference point in said array to the transducer element which gives rise to the signal in that channel, said function being set forth by the equation $$S = \frac{r\theta_1}{V_w}[(P_1)_{MAX.} - P_1]$$

where
$S$ = delay path along circumference of drum for any transducer under consideration
$r$ = radius of drum
$\theta_1$ = angular speed of drum in radians per second for a range $R_1$
$V_w$ = velocity of wave in propagation medium
$(P_1)_{MAX.}$ = delay path length for outermost transducer in array
$P_1$ = delay path length for transducer under consideration
the phasing of said array being controllable by varying the rotational speed of said magnetic drum.

2. Apparatus as set forth in claim 1, further including second drum means, second recording means, and second signal deriving-and-delay means substantially similar to that described in claim 1,
   said second recording means recording the signals from each of the channels of said first drum means in a separate channel on said second drum means, and
   the amount of delay introduced into each channel on said second drum means being in inverse relationship to the amount of delay introduced into the same channel on said first drum means.

3. Apparatus for varying the direction of the beam of a linear array of transducer elements comprising, in combination:
   first magnetic drum means;
   means for rotating said drum means at different speeds;
   first means for recording the signal from each of the transducer elements in a separate channel on said magnetic drum means;
   first means for individually deriving said separate recorded signals and for introducing time delays between the recording and deriving of said recorded signals,
   the amount of delay introduced into each channel being proportional to the distance from one end of said array of the transducer element which gives rise to the signal in that channel,
   the direction of said beam being shiftable by varying the rotational speed of said magnetic drum; and
   second drum means, second recording means and second signal deriving-and-delay means substantially similar to said first drum means, first recording means and first signal deriving-and-delay means, respectively, and similarly coupled and functioning,
   said second recording means recording the signals from each of the channels of said first drum means in a separate channel on said second drum means, and
   the amount of delay introduced into each channel on said second drum means being in inverse relationship to the amount of delay introduced into the same channel on said first drum means.

4. Apparatus for scanning the beam of a stationary linear array of transducer elements comprising, in combination:
   a first variable-speed magnetic drum;
   a first set of "write" heads equal to the number of transducer elements and arranged adjacent to the surface of said first drum, the line of centers through said "write" heads being parallel to the axis of rotation of said first drum, each consecutive "write" head being electrically connected with a different one of said transducer elements in consecutive order, the spacing of said "write" heads along their line of centers being proportional to the spacing of their electrically associated transducer elements along the line of the array;
   a first set of "read" heads equal to the number of transducer elements and arranged adjacent to the surface of said first drum, the line of centers through said "read" heads being disposed at an angle to the line of centers through said "write" heads, each consecutive "read" head being located in position to read out the information recorded on said drum by a different successive "write" head;

a second variable-speed magnetic drum;

a second set of "write" heads equal to the number of transducer elements and arranged adjacent to the surface of said second drum, the line of centers through said second set of "write" heads being parallel to the axis of rotation of said second drum, each consecutive "write" head being electrically connected with a different one of the 'read" heads of said first drum in consecutive order, the spacing of said second set of "write" heads being proportional to the spacing of their electrically associated "write" heads of said first drum; and a second set of "read" heads equal to the number of transducer elements and arranged adjacent to the surface of said second drum, the line of centers through said second set of "read" heads being disposed at an angle to the line of centers through said second set of write" heads, the slopes of the two lines of centers through said sets of "read" heads, relative to the axis of rotation of said two drums, being opposite to each other, each consecutive "read" head of said second set being located in position to read out the information recorded on said second drum by a different successive "write" head of said second set, the direction of the beam of said linear array being determined by the speed of said drums relative to each other.

5. Apparatus for scanning the base of a two-dimensional array having a plurality of transducer elements arranged in linear vertical columns and horizontal rows comprising, in combination:

first variable-speed magnetic drum;

a plurality of sets of "write" and "read" heads disposed adjacent to the surface of said drum, each set being associated with a different column of said transducer elements, and in each set, the number of "write" heads and the number of "read" heads being equal to the number of transducer elements in its associated column, each "write" head being electrically connected to a different one of the transducer elements in consecutive order, the line of centers through said "write" heads being parallel to the axis of rotation of said drum and the line of centers of said "read" heads being disposed at an angle to the line of centers through said "write" heads, the spacing of said "write" heads being proportional to the spacing of their electrically associated transducer elements in the vertical column, each consecutive "read" head being located in position to read out the information recorded by each consecutive "write' head, the outputs of the "read" heads being combined into a single output for the associated vertical column of the array;

a second variable-speed magnetic drum;

a first group of "write" heads equal to the number of horizontal rows in the array and arranged adjacent to the surface of said second drum, each consecutive "write" head being fed the output of a different one of said plurality of sets of "write" and "read" heads in consecutive order, the line of centers through said "write" heads being parallel to the axis of rotation of said second drum, the spacing of said "write" heads of said first group being proportional to the horizontal spacing between their electrically associated vertical array columns;

a first group of "read" heads equal to the number of horizontal rows in the array and arranged adjacent to the surface of said second drum, the line of centers through said "read" heads" being disposed at an angle to the line of centers through said first group of "write" heads, each consecutive "read" head being located in position to read out the information recorded on said second drum by a different successive "write" head;

a third variable-speed magnetic drum;

a second group of "write" heads equal to the number of horizontal rows in the array arranged adjacent to the surface of said third drum, each consecutive "write" head being electrically connected with a different one of the "read" heads of said second drum in consecutive order, the line of centers through said "write" heads of the second group being parallel to the axis of rotation of said third drum, the spacing of said second group of "write" heads being proportional to the spacing between their electrically associated "write" heads of said first group; and a second group of "read" heads equal to the number of horizontal rows in the array and arranged adjacent to the surface of said third drum, the line of centers through said second group of "read" heads, being disposed at an angle to the line of centers through said second group of "write" heads, the slopes of the two lines of centers through said groups of "read" heads, relative to the axes of rotation of said second and third drums, being opposite to each other, each consecutive "read" head of said second group being located in position to read out the information recorded on said third drum by a different successive "write" head of said second group, the azimuthal direction of the beam of said linear array being determined by the speed of said second and third drums relative to each other.

6. Apparatus for the introduction of time delays in the signal channels of the transducer elements of a linear transducer array comprising, in combination:

at least one rotatable magnetic drum;

means for varying the rotational speed of said drums;

a plurality of "write" heads each connected with a different one of said transducer elements, said "write" heads being arranged in line axially along and adjacent to the surface of said drum and spaced from each other in proportional correspondence with the spacing of their associated elements in the transducer array; and a plurality of "read" heads each connected with a different one of said "write" heads, said "read" heads being arranged adjacent to the surface of said drum and spaced from each other in proportional correspondence with the spacing of their associated elements in the transducer array, the spacing of each "read" head from its associated "write" head being in accordance with a function of the axial distance of its associated transducer element from a reference point in the transducer array, the magnitudes of the delay being variable by varying the rotational speed of said drum, said function by which the spacing of each "read" head from its associated "write" head is determined being the function set forth by the following equation $$S = \frac{r\theta_1}{V_w}](P_1)_{MAX.} - P_1]$$

where
- $S$ = delay path along circumference of drum for any transducer under consideration
- $r$ = radius of drum
- $\theta_1$ = angular speed of drum in radians per second for a range $R_1$
- $V_W$ = velocity of wave in propagation medium
- $(P_1)_{MAX.}$ = delay path length for outermost transducer in array
- $P_1$ = delay path length for transducer under consideration.

References Cited by the Examiner

UNITED STATES PATENTS

| | | | |
|---|---|---|---|
| 2,424,773 | 7/47 | Rieber | 340—16 |
| 2,825,043 | 2/58 | Abbott | 340—16 |
| 2,888,663 | 5/59 | Blake et al. | 340—15.5 |
| 2,927,656 | 3/60 | Feagin et al. | 340—15.5 |
| 3,096,501 | 7/63 | Williams | 340—15.5 |

CHESTER L. JUSTUS, *Primary Examiner.*